(12) United States Patent
Sakai et al.

(10) Patent No.: US 12,378,442 B2
(45) Date of Patent: Aug. 5, 2025

(54) FILM AND METHOD OF MANUFACTURING FLUORORESIN COMPOSITION

(71) Applicant: KOBAYASHI & CO., LTD., Tokyo (JP)

(72) Inventors: Keisuke Sakai, Matsudo (JP); Nanae Tanaka, Matsudo (JP)

(73) Assignee: KOBAYASHI & CO., LTD., Tokyo (JP)

( * ) Notice: Subject to any disclaimer, the term of this patent is extended or adjusted under 35 U.S.C. 154(b) by 65 days.

(21) Appl. No.: 17/440,609

(22) PCT Filed: Mar. 6, 2020

(86) PCT No.: PCT/JP2020/009724
§ 371 (c)(1),
(2) Date: Sep. 17, 2021

(87) PCT Pub. No.: WO2020/189346
PCT Pub. Date: Sep. 24, 2020

(65) Prior Publication Data
US 2022/0162479 A1 May 26, 2022

(30) Foreign Application Priority Data
Mar. 20, 2019 (JP) ................................. 2019-052293

(51) Int. Cl.
*C09J 7/29* (2018.01)
*C09J 7/38* (2018.01)

(52) U.S. Cl.
CPC .............. *C09J 7/29* (2018.01); *C09J 7/385* (2018.01); *C09J 2301/41* (2020.08); *C09J 2427/006* (2013.01); *C09J 2433/00* (2013.01); *C09J 2467/006* (2013.01); *Y10T 428/1476* (2015.01); *Y10T 428/2848* (2015.01); *Y10T 428/2891* (2015.01)

(58) Field of Classification Search
None
See application file for complete search history.

(56) References Cited

U.S. PATENT DOCUMENTS

| | | | |
|---|---|---|---|
| 5,132,164 A | 7/1992 | Moriya et al. | 428/199 |
| 6,444,311 B1 * | 9/2002 | Friedman | B32B 27/32 428/354 |
| 11,920,012 B2 * | 3/2024 | Sakai | C08J 7/0427 |
| 2010/0065212 A1 * | 3/2010 | Husemann | H01L 31/048 156/332 |
| 2013/0133830 A1 * | 5/2013 | Hull | B32B 27/28 156/309.3 |
| 2013/0330542 A1 * | 12/2013 | Wang | B32B 33/00 428/421 |
| 2016/0017165 A1 * | 1/2016 | Numrich | C09D 5/00 156/60 |

FOREIGN PATENT DOCUMENTS

| | | |
|---|---|---|
| CN | 104201224 A | 12/2014 |
| CN | 106926534 A | 7/2017 |
| JP | H 04-141414 A | 5/1992 |
| JP | H 05-105840 A | 4/1993 |
| JP | H 07-109435 A | 4/1995 |
| JP | 08-3519 A | 1/1996 |
| JP | 2001-106995 A | 4/2001 |
| JP | 2006-321238 A | 11/2006 |
| JP | 2015-179757 A | 10/2015 |
| JP | 2017-98483 A | 6/2017 |
| JP | 2018-107259 A | 7/2018 |
| WO | WO 2011/090023 A1 | 7/2011 |

OTHER PUBLICATIONS

Shuhei, Kishizawa, English translation of JP 2017098483 A, Jun. 1, 2017 (Year: 2017).*
Mei, Yunxiao et all, machine translation of CN 104201224 A, Dec. 10, 2014 (Year: 2014).*
Shuhei, Kishizawa, "Solar Cell Surface Protective Sheet, Solar Cell Module Using The Solar Cell Surface Protective Sheet, And a Manufacturing Method For Such", english translation of JP2017098483 A, Jun. 1, 2017 (Year: 2017).*
Mei, Yun-Xiao et al., "Transparent Back Plate For Solar Cell Modulue" english translation of CN104201224A, Dec. 10, 2014 (Year: 2014).*
Tsukada Ritsuko et al., Machine translation of JP2015179757 A, Aug. 10, 2015 (Year: 2015).*
Encyclopedia Britanica, "Catalyst", accessed online on May 29, 2025 (Year: 2025).*
Office Action mailed Feb. 8, 2023, issued to counterpart Singapore Application No. 11202110244Q.
International search Report dated Jun. 9, 2020, issued to International Application No. PCT/JP2020/009724.
Chinese Office Action dated Jun. 21, 2023, issued by the China National Intellectual Property Administration in corresponding application CN 202080022432.6.
Office Action mailed Jan. 12, 2024, issued to Chinese Application No. 202080022432.6.
Office Action mailed Jan. 4, 2024, issued to Taiwan Application No. 109108683.

(Continued)

*Primary Examiner* — Anish P Desai
(74) *Attorney, Agent, or Firm* — Stein IP, LLC

(57) ABSTRACT

An object of the invention is to provide a film having excellent weatherability. The present invention provides a film comprising: a base layer formed of a thermoplastic resin, and a fluororesin layer laminated to one face of the base layer, wherein the fluororesin layer contains a tetrafluoroethylene resin and a photostabilizer. The present invention also provides a method of manufacturing a fluororesin composition suitable for manufacturing the film. The method of manufacturing comprises a dissolving step in which a photostabilizer is dissolved in ester-based, ketone-based, or aromatic solvent to obtain a solution and a mixing step in which the solution is mixed with a fluororesin comprising tetrafluoroethylene resin.

10 Claims, 2 Drawing Sheets

(56) References Cited

OTHER PUBLICATIONS

Chinese Office Action dated Jun. 1, 2024, issued by the China National Intellectual Property Administration in corresponding application CN 202080022432.6.
Taiwan Office Action mailed on Oct. 4, 2024, issued to corresponding Taiwan Patent Application No. 109108683.
Office Action mailed Aug. 26, 2024, issued to related Chinese Patent Application No. 202080022432.6.
Malaysian Office Action dated Jun. 28, 2024, issued by the Intellectual Property Corporation of Malaysia in corresponding application My PI2021005436.

* cited by examiner

FILM AND METHOD OF MANUFACTURING FLUORORESIN COMPOSITION

CROSS-REFERENCE TO RELATED APPLICATIONS

This application is a national stage of International Application No. PCT/JP2020/009724, filed Mar. 6, 2020, which claims the benefit of Japanese Application No. 2019-052293, filed Mar. 20, 2019, in the Japanese Patent Office, the disclosures of which are incorporated herein by reference.

TECHNICAL FIELD

The present invention relates to a film and a method of manufacturing a fluororesin composition, and more specifically relates to a film having excellent weatherability and a method of manufacturing a fluororesin composition used for manufacturing such film.

BACKGROUND ART

Various surface protection films have been developed so far. Each surface protection film has a composition or a layer structure suitable for each purpose. For example, Patent Document 1 listed below discloses a surface protection film formed by laminating and integrating a base layer consisting of a thermoplastic resin and an adhesive agent layer, wherein the resin part constituting the adhesive agent layer contains a specific fluorine compound in amount of 0.5 to 5 parts by weight relative to 100 parts by weight of a rubber-based polymer (claim 1). It is described that the surface protection film exhibits good initial close contactness to an adherend and that, after pasting, it can be easily peeled when peeling from the adherend (paragraph 0034).

CITATION LIST

Patent Document

Patent Document 1: JP-A 2001-106995

SUMMARY OF THE INVENTION

Technical Problem

An electric appliance product mostly should have indication of its quality on the product itself under regulations. The indication may for example be engraved on the surface of a nameplate or a seal pasted on an apparatus. The indication is preferably visible anytime for example over the period of use.

However, an indication provided on the surface of an outdoor electric appliance such as an outdoor unit of an air conditioner, which is exposed to sunlight or rain occasionally, readily disappears. A nameplate or seal, on which the indication has been engraved, also tends to be degraded due to sunlight or rain. Accordingly, the present invention is intended to provide a film having excellent weatherability which allows the indication to be maintained over a prolonged period and/or allows a nameplate or a seal having the indication to be protected over a prolonged period.

As a resin having excellent weatherability, a fluororesin can be exemplified. It is further preferable that the weatherability of the fluororesin is further improved. As an additive for improving the weatherability, a photostabilizer is exemplified.

Nevertheless, the photostabilizer is sparingly dispersed in the fluororesin, and it was difficult to obtain a photostabilizer-containing fluororesin composition suitable for constituting a film layer.

Solution to Problem

The inventors of the present invention have found that it becomes possible to disperse a photostabilizer uniformly in a fluororesin by a specific technique. As a result, it became possible to manufacture a film having a fluororesin layer which contains a photostabilizer.

Thus, the present invention provides a film comprising a base layer formed of a thermoplastic resin, and a fluororesin layer laminated to one face of the base layer, wherein the fluororesin layer comprises a tetrafluoroethylene resin and a photostabilizer.

The photostabilizer is any single compound or a combination of two or more compounds selected from the group consisting of triazine-based ultraviolet absorber, benzotriazole-based ultraviolet absorber, benzophenone-based ultraviolet absorber and hindered amine-based photostabilizer.

The thermoplastic resin may be a polyester-based resin.

The film may be transparent.

The film may further comprise an adhesive layer laminated to the other face of the base layer.

The adhesive layer may be formed of an acrylic resin composition.

A separator may be laminated to the face opposite to the face in contact with the base layer, among two faces of the adhesive layer.

The film may be one for outdoor use.

The film may be used for covering a face having letters or patterns formed thereon.

The face is a metal face or resin face.

Also the present invention provides a method of manufacturing a fluororesin composition, wherein the method comprises a dissolving step in which a photostabilizer is dissolved in an ester-based, ketone-based or aromatic solvent thereby obtaining a solution, and a mixing step in which the solution is mixed with a tetrafluoroethylene polymer.

Advantageous Effects of Invention

According to the present invention, a film having excellent weatherability can be obtained. The film allows an indication provided on the surface for example of an electric appliance for outdoor use to be maintained over a prolonged period.

The effect of the invention is not necessarily limited to that described in this paragraph and may be any of the effect described in the present specification.

DESCRIPTION OF EMBODIMENTS

Figure 1:
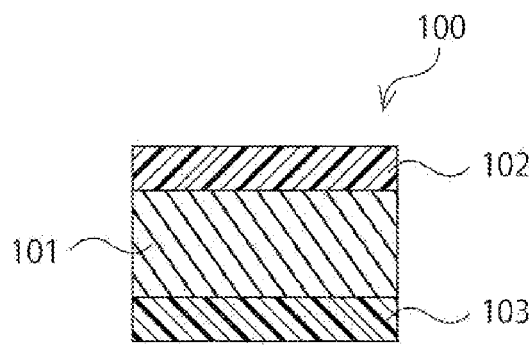
FIG. 1 is a view showing an example of the structure of a film of the present invention.

Embodiments for carrying out the present invention will now be described in detail. Embodiments described below are merely examples of typical embodiments of the present invention, and the present invention is not limited to these embodiments.

1. Film

A film of the present invention comprises at least a base layer formed of a thermoplastic resin, and a fluororesin layer laminated to one face of the base layer, wherein the fluororesin layer comprises a tetrafluoroethylene resin and a photostabilizer.

By means of the fluororesin layer comprising a tetrafluoroethylene resin and a photostabilizer, the indication (for example letters or patterns) on the surface covered by the film can be maintained over a prolonged period, and the deterioration of an object covered by the film can be prevented over a prolonged period.

Also, by means of the fluororesin layer comprising a tetrafluoroethylene resin and a photostabilizer, the deterioration of the base layer can be prevented. Accordingly, the film itself can be maintained over a prolonged period.

It is difficult to disperse a photostabilizer in a tetrafluoroethylene resin, and it is difficult to obtain a fluororesin composition containing a photostabilizer and a tetrafluoroethylene polymer suitable for forming a thin and transparent film-constituting layer. The inventors of the present invention have found that it is possible to disperse a photostabilizer uniformly in a fluororesin by a specific technique. By means of the fluororesin composition obtained by this technique, a thin layer that constitutes a film can be formed. The layer formed of the fluororesin composition has excellent weatherability and is also transparent. Accordingly, the layer is suitable for outdoor use. In addition, the layer can maintain the visibility of the surface covered by the layer while it can protect the surface over a prolonged period.

According to one preferred embodiment of the present invention, on the other face of the base layer, another layer may for example be laminated. For example, a film of the present invention may be pasted onto the surface to be covered via the another layer.

Another layer may for example be an adhesive layer. In other words, the adhesive layer may be laminated to the other face of the base layer. By means of the adhesive layer, it becomes easier to paste the film of the present invention to a surface to be covered, thereby allowing the film of the present invention to be maintained on the surface stably.

According to another preferred embodiment of the present invention, on the other face of the base layer, another layer may not be laminated. In other words, a film of the present invention may be constituted only by the fluororesin layer and the base layer. In such case, for example, the base layer of the film of the present invention may be laminated directly to the surface to be covered. For example, by heating the base layer and pasting the film of the present invention (particularly the base layer), while being heated, onto the surface to be covered, the relative position between the film of the present invention and the surface can be locked.

A film of the present invention is preferably transparent. As used herein, transparent means that the total light transmittance determined in accordance with JIS K7105 is 85% or more, preferably 90% or more, and more preferably 95% or more. A film of the present invention which is transparent can protect a surface having engraved letters or patterns over a prolonged period while maintaining the engraved letters or patterns over a prolonged period.

A film of the present invention has excellent weatherability.

For example, when subjected to a moisture-heat resistance test environment (1000 hours, 85° C. and 85% RH), a film of the present invention may exhibit, for example, a ΔYI (yellow index) of 0.5 or less, especially 0.4 or less, and more especially 0.3 or less, as determined in accordance with ASTM E313. In the moisture-heat resistance test environment, the film of the present invention is placed in a condition in which the fluororesin layer is in direct contact with the environment, for example placed in a condition in which the adhesive layer is pasted onto any basal substance while the fluororesin layer is exposed.

For example, when subjected to the same test environment, a film of the present invention may exhibit for example a tensile-strength retention rate of 70% or more, especially 73% or more, and more especially 75% or more, the retention rate being a rate of the tensile strength (as determined in accordance with JIS K7127) after being subjected to the test environment relative to the tensile strength before being subjected to the test environment.

Also, when subjected to a moisture-heat resistance test environment (2000 hours, 85° C. and 85% RH), the film of the present invention may exhibit, for example, a ΔYI (yellow index) of 0.55 or less, especially 0.45 or less, and more especially 0.35 or less, as determined in accordance with ASTM E313. In the moisture-heat resistance test environment described above, the film of the present invention is placed in a condition in which the fluororesin layer is in direct contact with the environment, for example placed in a condition in which the adhesive layer is pasted onto any basal substance and the fluororesin layer is exposed.

For example, when subjected to the same test environment, a film of the present invention may exhibit for example a tensile-strength retention rate of 60% or more, especially 63% or more, and more especially 65% or more, the retention rate being a rate of the tensile strength (determined in accordance with JIS K7127) after being subjected to the test environment, relative to the tensile strength before being subjected to the test environment.

For example, after being subjected to the same test environment, the surface of the fluororesin layer of a film of the present invention may exhibit for example an adherability of 3B to 5B, especially 4B to 5B, and more especially 5B, as determined in accordance with ASTM D3359.

For example, when subjected to salt water spray in accordance with JIS Z2371 (4 cycles of [2-hour salt water spray followed by being allowed to stand in the environment of 40° C. and 93% RH for 7 days]), a film of the present invention may exhibit for example a tensile-strength retention rate of 80% or more, especially 90% or more, and more especially 95% or more, the retention rate being a rate of the tensile strength (determined in accordance with JIS K7127) after being subjected to the salt water spray, relative to the tensile strength before being subjected to the salt water spray. In the salt water spray described above, the film of the present invention allows the fluororesin layer to be exposed to the salt water, and the adhesive layer is pasted for example onto any basal substance and the salt water is sprayed onto the fluororesin layer.

For example, when subjected to the same salt water spray, a film of the present invention may exhibit for example an elasticity retention rate of 80% or more, especially 90% or more, and more especially 95% or more, the elasticity retention rate being a rate of the elasticity after being subjected to the salt water spray, relative to the elasticity (determined in accordance with JIS K7127) before being subjected to the salt water spray.

For example, after being subjected to the same salt water spray, a film of the present invention may exhibit an adherability of 3B to 5B, especially 4B to 5B, and more especially 5B, as determined in accordance with ASTM D3359.

For example, when subjected to the same salt spray, a film of the present invention may exhibit a ΔYI (yellow index) of 0.6 or less, especially 0.5 or less, and more especially 0.45 or less, as determined in accordance with ASTM E313.

For example, when subjected to ultraviolet irradiation test in accordance with ASTM G26 (1000 hours, 63° C., Xenon arc type, with water spray), a film of the present invention may exhibit for example, a ΔYI (yellow index) of 0.5 or less, especially 0.4 or less, and more especially 0.3 or less, as determined in accordance with ASTM E313. In the ultraviolet irradiation test described above, the film of the present invention allows the fluororesin layer to be exposed directly to the ultraviolet rays, and the adhesive layer is pasted for example to any basal substance and the ultraviolet rays are irradiated to the fluororesin layer.

For example, when subjected to the same ultraviolet irradiation test, a film of the present invention may exhibit for example a tensile-strength retention rate of 80% or more, especially 85% or more, and more especially 90%, the retention rate being a rate of the tensile strength (determined in accordance with JIS K7127) after being subjected to the test environment, relative to the tensile strength before being subjected to the ultraviolet irradiation test.

For example, when subjected to the same ultraviolet irradiation test, a film of the present invention may exhibit for example a elasticity retention rate of 70% or more, especially 80% or more, and more especially 85%, the elasticity retention rate being a rate of the elasticity (determined in accordance with JIS K7127) after being subjected to the test environment, relative to the elasticity before being subjected to the ultraviolet irradiation test.

For example, after being subjected to the same ultraviolet irradiation test, a film of the present invention may exhibit an adherability of 3B to 5B, especially 4B to 5B, and more especially 5B, as determined in accordance with ASTM D3359.

An example of the structure of a film of the present invention is shown in FIG. 1. As shown in FIG. 1, a film 100 of the present invention comprises a base layer 101, a fluororesin layer 102 laminated to one face of the base layer 101 and an adhesive layer 103 laminated to the other face of the base layer 101. In other words, the film 100 has a laminate structure in which the fluororesin layer 102, the base layer 101 and the adhesive layer 103 are laminated in this order.

Among the two faces of the adhesive layer 103, the face opposite to the face in contact with the base layer 101 may be provided for example with a separator layer. By providing a separator layer, the adhesive layer 103 is prevented from being pasted to an unintended surface.

In addition, an intermediate layer may be provided between the base layer 101, and the adhesive layer 103. For example, when bonding between the base layer 101 and the adhesive layer 103 is poor, by providing the intermediate layer exhibiting excellent bonding to both of the base layer 101 and the adhesive layer 103, the base layer 101 and the adhesive layer 103 are prevented from being separated from each other.

A film of the present invention will now be described in more detail.

[Base Layer]

The base layer is formed of a thermoplastic resin. The thermoplastic resin may for example be a polyester-based resin, a polyolefinic resin, a polyamide-based resin or a polyvinyl chloride-based resin. For improving the weatherability of the base layer itself, the thermoplastic resin is preferably a polyester-based resin.

The polyester-based resin is a macromolecule having an ester bond in its backbone chain. The polyester-based resin may for example be a polymer of a polyhydric alcohol with a polybasic acid. The polyester-based resin may for example be one or a combination of two or more selected from the group consisting of a polyethylene terephthalate (PET) resin, a polybutylene terephthalate (PBT) resin, a polyethylene naphthalate (PEN) resin, a polybutylene naphthalate (PBN) resin and a polycarbonate (PC) resin. The polyester-based resin is a resin whose main component is a polyester, and may contain the polyester in an amount, relative to the mass of the resin, of 90% by mass or more, preferably 95% by mass or more, preferably 98% by mass or more.

The polyester-based resin is preferably a PET resin, more preferably a hydrolysis-resistant PET resin. A hydrolysis-resistant PET resin can further improve the weatherability of the film. The hydrolysis-resistant PET resin means a PET resin whose resistance to hydrolysis is enhanced when compared with a conventional PET resin. A hydrolysis-resistant PET resin contains oligomers in the resin in an amount which is smaller when compared with an ordinary PET resin. The oligomers are molecules having lower degrees of polymerization produced during manufacture of a PET resin, and may be oligomers of ethylene terephthalate. Since the oligomers have a promotive effect on the hydrolysis of the PET resin, the hydrolysis of the PET resin can be suppressed by reducing the amount of the oligomers. A hydrolysis-resistant PET resin refers to a PET resin whose oligomer content is 1 wt % or less, preferably a PET resin whose oligomer content is 0.8 wt % or less, and more preferably a PET resin whose oligomer content is 0.7 wt % or less. The oligomer content is determined for example by a method described in JP-A 1999-288622.

The polyolefinic resin described above may for example be a macromolecule obtained by polymerization using olefins (for example α-olefins) as major monomers. The polyolefinic resin may for example be a polyethylene-based resin, a polypropylene-based resin, or a mixture thereof. The polyethylene based-resin is a resin whose main component is polyethylene, and may contain polyethylene in an amount, relative to the resin mass, of 90% by mass or more, preferably 95% by mass or more, and preferably 98% by mass or more. The polypropylene based-resin is a resin whose main component is polypropylene, and may contain polypropylene in an amount, relative to the resin mass, of 90% by mass or more, preferably 95% by mass or more, and more preferably 98% by mass or more.

The polyamide-based resin described above is a resin whose main component is polyamide, and may contain polyamide in an amount, relative to the resin mass, of 90% by mass or more, preferably 95% by mass or more, and preferably 98% by mass or more. The polyamide may for example be an aliphatic polyamide, more specifically polyamide 6, polyamide 6·6, polyamide 6·10, polyamide 11, polyamide 12 or polyamide 6·12.

The polyvinyl chloride-based resin described above is a resin whose main component is polyvinyl chloride, and may contain polyvinyl chloride in an amount, relative to the resin mass, of 90% by mass or more, preferably 95% by mass or more, and preferably 98% by mass or more. The polyvinyl chloride may for example be a homopolymer of vinyl chloride, or may also be a copolymer of vinyl chloride with a comonomer. The comonomer may for example be vinyl acetate or ethylene.

The thickness of the base layer may for example be 10 μm to 80 μm, preferably 15 μm to 75 μm, and more preferably 20 μm to 70 μm. A thickness within the numerical range described above gives a transparency to a film and gives a strength, which a surface protection film should have, to a film.

[Fluororesin Layer]

The fluororesin layer is laminated onto one face of the base layer. The fluororesin layer may preferably be the surface layer of a film of the present invention. In such case, the fluororesin layer exerts the weatherability more effectively.

The fluororesin layer contains a tetrafluoroethylene resin, and preferably contains a tetrafluoroethylene resin as a main component. It is intended here that the tetrafluoroethylene is a main component when the resin component constituting the fluororesin is formed only of the tetrafluoroethylene resin, or when the amount of the tetrafluoroethylene resin is the largest among the resin components contained in the fluororesin. For example, the tetrafluoroethylene resin content in the fluororesin layer, relative to the total mass of the fluororesin, may for example be 80% by mass or more, preferably 85% by mass or more, and more preferably 90% by mass or more. The content, relative to the total mass of the fluororesin, may for example be 99% by mass or less, especially 98% by mass or less, and more especially 97% by mass.

The fluororesin layer preferably contains no chlorine. As a result of absence of chlorine, endurance and/or antifouling properties of the layer are improved.

As used herein, the tetrafluoroethylene resin means a component obtained by curing reaction of a tetrafluoroethylene polymer (particularly reactive functional group-containing tetrafluoroethylene polymer) and a curing agent described below. The fluororesin layer contains a photostabilizer in addition to the tetrafluoroethylene resin. The photostabilizer may be contained in the fluororesin composition subjected to the curing reaction described above. In other words, a fluororesin layer may be a cured product of a fluororesin composition containing a tetrafluoroethylene polymer, a curing agent and a photostabilizer.

The tetrafluoroethylene polymer contained in the fluororesin composition may be a tetrafluoroethylene polymer which can be cured by the curing agent, and may preferably be a reactive functional group-containing tetrafluoroethylene polymer. The reactive functional group and the curing agent may appropriately be selected by a person skilled in the art.

The reactive functional group may, for example, be a hydroxy group, a carboxyl group, the group represented by —COOCO—, an amino group, or a silyl group and is preferably a hydroxy group. Such groups allow a reaction for giving the cured product to satisfactory proceed.

Of these reactive functional groups, a hydroxy group is particularly suitable to the reaction for giving the cured product. In other words, the reactive functional group-containing tetrafluoroethylene polymer may preferably be a hydroxy group-containing tetrafluoroethylene polymer.

The fluorine-containing unit of the reactive functional group-containing tetrafluoroethylene polymer is preferably a fluorine-containing unit based on a perfluoroolefin. The fluorine-containing unit based on the perfluoroolefin may more preferably be based on one, two, or three selected from tetrafluoroethylene (tetrafluoroethylene, also referred to as "TFE" in the present specification), hexafluoropropylene (HFP), and perfluoro (alkyl vinyl ethers) (PAVEs). Preferably, of the fluorine-containing units based on the perfluoroolefin, the amount of a fluorine-containing unit based on TFE is the largest.

The hydroxy value of the reactive functional group-containing tetrafluoroethylene polymer (particularly the hydroxy value of the hydroxy group-containing tetrafluoroethylene polymer) may preferably be 10 mg KOH/g to 300 mg KOH/g, more preferably 10 mg KOH/g to 200 mg KOH/g, and even more preferably 10 mg KOH/g to 150 mg KOH/g. The reactive functional group-containing tetrafluoroethylene polymer having a hydroxy value within the above numerical range may make the resin composition have good curing properties. The hydroxy value is determined by a method in accordance with JIS K 0070.

The acid value of the reactive functional group-containing tetrafluoroethylene polymer (particularly the acid value of the hydroxy group-containing tetrafluoroethylene polymer) may preferably be 0.5 mgKOH/g to 100 mgKOH/g, and more preferably 0.5 mg KOH/g to 50 mgKOH/g. The reactive functional group-containing tetrafluoroethylene polymer having an acid value within the above numerical range may make the resin composition have good curing properties.

The reactive functional group of the reactive functional group-containing tetrafluoroethylene polymer may be introduced into the tetrafluoroethylene polymer by copolymerization of a monomer having the reactive functional group with a fluorine-containing monomer (particularly the above perfluoroolefin). In other words, the reactive functional group-containing tetrafluoroethylene polymer may contain a polymer unit based on a reactive functional group-containing monomer and a polymer unit based on a fluorine-containing monomer (particularly the above perfluoroolefin)

When the reactive functional group is a hydroxy group, the monomer having the reactive functional group may preferably be a hydroxy group-containing vinyl ether or a hydroxy group-containing allyl ether. Examples of the hydroxy group-containing vinyl ether include 2-hydroxyethyl vinyl ether, 3-hydroxypropyl vinyl ether, 2-hydroxypropyl vinyl ether, 2-hydroxy-2-methylpropyl vinyl ether, 4-hydroxybutyl vinyl ether, 4-hydroxy-2-methylbutyl vinyl ether, 5-hydroxypentyl vinyl ether, and 6-hydroxyhexyl vinyl ether, and examples of the hydroxy group-containing allyl ether include 2-hydroxyethyl allyl ether, 4-hydroxybutyl allyl ether, and glycerol monoallyl ether. Alternatively, the monomer having the reactive functional group may, for example, be a hydroxyalkyl ester of (meth)acrylic acid such as 2-hydroxyethyl acrylate and 2-hydroxyethyl methacrylate. As the monomer having the reactive functional group, these compounds may be used singly or in combination of two or more of them. When the reactive functional group is a hydroxy group, the monomer having the reactive functional group may more preferably be a hydroxy group-containing vinyl ether and specifically preferably 4-hydroxybutyl vinyl ether and/or 2-hydroxyethyl vinyl ether from the viewpoint of curing properties of the resin composition.

When the reactive functional group is a carboxyl group, the monomer having the reactive functional group may preferably be an unsaturated carboxylic acid, an ester of an unsaturated carboxylic acid, or an acid anhydride of an unsaturated carboxylic acid.

When the reactive functional group is an amino group, the monomer having the reactive functional group may, for example, be an amino vinyl ether or allylamine.

When the reactive functional group is a silyl group, the monomer having the reactive functional group may preferably be a silicone vinyl monomer.

The fluorine-containing monomer is preferably a perfluoroolefin. Examples of the perfluoroolefin include tetrafluoroethylene (TFE), hexafluoropropylene (HFP), and perfluoro (alkyl vinyl ethers) (PAVEs). Preferably, the fluorine-containing monomer comprises TFE.

Preferably, the reactive functional group-containing tetrafluoroethylene polymer may contain, in addition to the polymer unit based on a reactive functional group-containing monomer and the polymer unit based on a fluorine-containing monomer, a polymer unit based on a fluorine-free vinyl monomer. The fluorine-free vinyl monomer may, for example, be a single monomer or a combination of two or more monomers selected from vinyl carboxylate esters, alkyl vinyl ethers, and non-fluorinated olefins.

Examples of the vinyl carboxylate esters include vinyl acetate, vinyl propionate, vinyl butyrate, vinyl isobutyrate, vinyl pivalate, vinyl caproate, vinyl versatate, vinyl laurate, vinyl stearate, vinyl cyclohexylcarboxylate, vinyl benzoate, and vinyl para-t-butylbenzoate.

Examples of the alkyl vinyl ether include methyl vinyl ether, ethyl vinyl ether, butyl vinyl ether, and cyclohexyl vinyl ether.

Examples of the non-fluorinated olefin include ethylene, propylene, n-butene, and isobutene.

The reactive functional group-containing tetrafluoroethylene polymer may contain, in addition to the polymer unit based on a reactive functional group-containing monomer and the polymer unit based on a fluorine-containing monomer as a perfluoroolefin, a polymer unit based on a fluoromonomer other than the perfluoroolefin, such as vinylidene fluoride (VdF), chlorotrifluoroethylene (CTFE), vinyl fluoride (VF), and fluorovinyl ether.

The reactive functional group-containing tetrafluoroethylene polymer may, for example, be a TFE/non-fluorinated olefin/hydroxybutyl vinyl ether copolymer, a TFE/vinyl carboxylate ester/hydroxybutyl vinyl ether copolymer, or a TFE/alkyl vinyl ether/hydroxybutyl vinyl ether copolymer.

More specifically, the reactive functional group-containing tetrafluoroethylene polymer may be a TFE/isobutylene/hydroxybutyl vinyl ether copolymer, a TFE/vinyl versatate/hydroxybutyl vinyl ether copolymer, or a TFE/VdF/hydroxybutyl vinyl ether copolymer. The reactive functional group-containing tetrafluoroethylene polymer may particularly preferably be a TFE/isobutylene/hydroxybutyl vinyl ether copolymer or a TFE/vinyl versatate/hydroxybutyl vinyl ether copolymer.

As a tetrafluoroethylene polymer described above, for example, a product in a Zeffle GK series may be used.

The curing agent contained in the fluororesin composition may appropriately be selected by a person skilled in the art depending on the type of a reactive functional group contained in the tetrafluoroethylene polymer.

When the reactive functional group is a hydroxy group, the curing agent may preferably be a single agent or a combination of two or more agents selected from isocyanate curing agents, melamine resins, silicate compounds, and isocyanate group-containing silane compounds.

When the reactive functional group is a carboxyl group, the curing agent may preferably be a single agent or a combination of two or more agents selected from amino curing agents and epoxy curing agents.

When the reactive functional group is an amino group, the curing agent may be a single agent or a combination of two or more agents selected from carbonyl group-containing curing agents, epoxy curing agents, and acid anhydride curing agents.

The content of the curing agent in the fluororesin composition may, for example, be 10 parts by mass to 30 parts by mass, preferably 12 parts by mass to 28 parts by mass, and more preferably 15 parts by mass to 25 parts by mass relative to 100 parts by mass of the tetrafluoroethylene polymer. These numerical ranges apply also to the content of the curing agent in a cured product of the fluororesin composition.

The content of the curing agent may be determined by pyrolysis gas chromatography (Py-GC/MS).

In an embodiment of the present invention, the reactive functional group contained in the tetrafluoroethylene polymer may be a hydroxy group, and the curing agent may be an isocyanate curing agent. In the embodiment, the isocyanate curing agent is preferably a hexamethylene diisocyanate (HDI) polyisocyanate.

The content of the HDI polyisocyanate in the fluororesin composition may, for example, be 10 parts by mass to 30 parts by mass, preferably 12 parts by mass to 28 parts by mass, and more preferably 15 parts by mass to 25 parts by mass relative to 100 parts by mass of the tetrafluoroethylene polymer. These numerical ranges apply also to the content of the HDI polyisocyanate in a cured product of the fluororesin composition.

As an HDI polyisocyanate, for example, a single polyisocyanate or a combination of two or more polyisocyanates selected from isocyanurate-type polyisocyanates, adduct-type polyisocyanates, and biuret-type polyisocyanates may be used. In the present invention, the isocyanate curing agent may preferably be an isocyanurate-type polyisocyanate, or may be a combination of an isocyanurate-type polyisocyanate and an adduct-type polyisocyanate. An especially preferable curing agent is an isocyanurate-type polyisocyanate.

The fluororesin composition preferably contain a solvent. The solvent may preferably be a single solvent or a solvent mixture of two or more selected from the group of an ester-based solvent, a ketone-based solvent and an aromatic solvent. These solvents are suitable for dispersing the photostabilizer in a fluororesin composition. Particularly preferably, the solvent comprises an ester-based solvent, and comprises, for example, ethyl acetate. An ester-based solvent is particularly suitable for dispersing the photostabilizer in the fluororesin composition.

As the ester-based solvent described above, ethyl acetate, butyl acetate, 2-ethoxybutyl acetate (Cellosolve Acetate) and propylene glycol monomethyl acetate (PGM-Ac) can be exemplified.

As the ketone-based solvent described above, acetone, methyl ethyl ketone (MEK), methyl isobutyl ketone (MIBK), 2-heptanone (MAK) and cyclohexane can be exemplified.

As the aromatic solvent described above, toluene and xylene can be exemplified.

According to one preferred embodiment of the present invention, the solvent is an ester-based solvent, more preferably one or a combination of two or more selected from ethyl acetate, butyl acetate, 2-ethoxyethyl acetate and propylene glycol monomethyl ether acetate, more preferably ethyl acetate and/or butyl acetate, and especially preferably ethyl acetate. Ethyl acetate is particularly preferred because of satisfactory coatability of a fluororesin composition (particularly, coating properties in view of boiling point), low environmental impact, and also from the cost point of view.

According to another preferred embodiment of the present invention, the solvent is a combination of an ester-based solvent and an aromatic solvent, and may for example be a combination of ethyl acetate and toluene. The mass ratio of ethyl acetate and toluene may for example be 2:1 to 20:1, preferably 5:1 to 15:1, and more preferably 8:1 to 12:1.

According to still another preferable embodiment of the present invention, the solvent is a combination of an ester-based solvent and a ketone-based solvent, and may for example be a combination of ethyl acetate and MEK. The mass ratio of ethyl acetate and MEK may for example be 3:1 to 1:3, preferably 2:1 to 1:2, and more preferably 1.5:1 to 1:1.5.

These embodiments are especially preferred in view of photostabilizer dispersibility, especially triazine-based photostabilizer dispersibility.

The photostabilizer is preferably a single compound or a mixture of two or more compounds selected from the group consisting of a triazine-based ultraviolet absorber, a benzotriazole-based ultraviolet absorber, a benzophenone-based ultraviolet absorber, and a hindered amine-based photostabilizer, and more preferably a single compound or a combination of two or more compounds selected from triazine-based ultraviolet absorbers. A triazine-based ultraviolet absorber is preferred because of a higher ability of absorbing ultraviolet rays and a lower volatility when compared with other photostabilizers. Moreover, a triazine-based ultraviolet absorber is preferred especially in view of solubility in the fluororesin composition. A combination of two or more compounds can give a wider wavelength range of the ultraviolet rays to be absorbed.

As triazine-based ultraviolet absorbers, following Compounds 1 to 7 can be exemplified.

Compound 1: 2-(4,6-diphenyl-1,3,5-triazine-2-yl)-5-[2-(2-ethylhexanoyloxy)ethoxy]phenol;

Compound 2: 2,4,6-tris(2-hydroxy-4-hexyloxy-3-methylphenyl)-1,3,5-triazine;

Compound 3: 2-[4-[(2-hydroxy-3-dodecyloxypropyl) oxy]-2-hydroxyphenyl]-4,6-bis(2,4-dimethylphenyl)-1,3,5-triazine;

Compound 4: 2-[4-[(2-hydroxy-3-tridecyloxypropyl) oxy]-2-hydroxyphenyl]-4,6-bis(2,4-dimethylphenyl)-1,3,5-triazine;

Compound 5: 2-[4-[(2-hydroxy-3-(2'-ethyl)hexyl)oxy]-2-hydroxyphenyl]-4,6-bis(2,4-dimethylphenyl)-1,3,5-triazine;

Compound 6: 2,4-bis(2-hydroxy-4-butyloxyphenyl)-6-(2,4-bis-butyloxyphenyl)-1,3,5-triazine;

Compound 7: 2-[2-hydroxy-4-(1-octyloxycarbonylethoxy)-phenyl]-4,6-bis(4-phenylphenyl)-1,3,5-triazine).

Compound 1 is available commercially for example as ADEKASTAB LA-46.

Compound 2 is available commercially for example as ADEKASTAB LA-F70.

A combination of Compound 3 and 4 is available commercially for example as TINUVIN (trademark) 400.

Compound 5 is available commercially for example as TINUVIN (trademark) 405.

Compound 6 is available commercially for example as TINUVIN (trademark) 460.

Compound 7 is available commercially for example as TINUVIN (trademark) 479.

In the present invention, the photostabilizer may preferably be a single one or a combination of two or more selected from the group consisting of Compounds 1 to 7 listed above. Particularly preferably, the photostabilizer may be one, two, three or four selected from the group consisting of Compound 1, Compound 3, Compound 4 and Compound 7, and more preferably Compound 1, or a combination of Compound 3, Compound 4 and Compound 7.

The photostabilizer content of the fluororesin composition, relative to 100 parts by mass of the reactive functional group-containing tetrafluoroethylene polymer, may for example be 1 parts by mass to 10 parts by mass, preferably 2 parts by mass to 9 parts by mass, more preferably 3 parts by mass to 8 parts by mass. These numerical ranges apply also to the photostabilizer content of a cured product of the fluorine resin composition.

The thickness of the fluororesin layer may for example be 1 μm to 30 μm, preferably 3 to 20 μm, and more preferably 5 μm to 15 μm. A thickness within the numerical range described above allows the film transparency to be maintained while allowing the weatherability attributable to the fluororesin layer to be exerted effectively.

The fluororesin composition is manufactured by a method of manufacturing a fluororesin composition described separately below. According to the method of manufacturing, a photostabilizer is dispersed satisfactorily in a fluororesin composition containing a tetrafluoroethylene polymer, thereby giving a fluororesin composition containing the photostabilizer and the tetrafluoroethylene polymer which are suitable for forming a film-constituting membrane.

A cured product of the fluororesin composition may be obtained as follows: the fluororesin composition is applied onto the surface of the base layer, and is heated, for example, at 100° C. to 200° C., preferably at 120° C. to 180° C., for example, for 10 seconds to 240 seconds, preferably for 30 seconds to 120 seconds. The cured product forms the fluororesin layer. The application amount of the fluororesin composition may appropriately be set by a person skilled in the art depending on the thickness of a surface layer to be formed.

In a preferred embodiment of the present technique, the fluororesin layer is formed of a cured product of a fluororesin composition containing the tetrafluoroethylene polymer, the curing agent, and the photostabilizer. More preferably, the fluororesin layer is formed of a cured product of a fluororesin composition containing a hydroxy group-containing tetrafluoroethylene polymer, an HDI-based polyisocyanate and a triazine-based ultraviolet absorber.

Such fluororesin layer especially contributes to imparting a film of the present invention with excellent weatherability and transparency.

[Adhesive Layer]

A film of the present invention may have an adhesive layer laminated to the face, among two faces of the base layer, which is opposite to the face to which a fluororesin layer is laminated. The adhesive layer may be formed for example of an acrylic resin composition. The adhesive layer formed of an acrylic resin composition exhibits more excellent weatherability when compared with an adhesive layer formed of other resin compositions such as rubber based-resin composition.

The acrylic resin composition described above may preferably contain, as a main component, an acrylic polymer such as a polymer of (meth)acrylic acid ester monomer. The (meth)acrylic acid ester monomer may for example be a (meth)acrylic acid ester of an alcohol having an alkyl group having 2 to 12 carbon atoms, preferably an alkyl group having 4 to 12 carbon atoms. Such (meth)acrylic acid ester monomer may more specifically be a single one or a combination of two or more selected from n-butyl (meth) acrylate, 2-ethylhexyl (meth)acrylate, isooctyl (meth)acrylate, n-octyl (meth)acrylate, isononyl (meth)acrylate and lauryl (meth)acrylate. As used herein, "(meth)acrylate" includes both of acrylate and methacrylate.

The acrylic resin composition may preferably be an adhesive composition obtained by heating a composition containing an acrylic polymer and a curing agent. The curing agent may for example be, but is not limited to, an epoxy-based crosslinking agent and/or an isocyanate-based crosslinking agent. The temperature and the time period for the curing may appropriately be selected by a person skilled in the art depending on the polymer and the curing agent which are employed. The temperature may for example be 60° C. to 120° C., and more preferably 70° C. to 110° C. The time period may for example be 30 seconds to 5 minutes, and preferably 1 minute to 3 minutes.

An adhesive layer formed of the acrylic resin composition may for example be highly adhesive, and may for example have an adhesiveness to a stainless steel (SUS) which is preferably 5 to 30 N/25 mm, and more preferably 10 to 30 N/25 mm.

On the face, among 2 faces of the adhesive layer, which is opposite to the face to which the base layer is laminated, a separator may for example be further laminated. In other words, a film of the present invention may have a layer structure in which a fluororesin layer, a base layer, an adhesive layer, and a separator are laminated in this order. The separator can prevent the adhesive layer from being pasted to the face other than the surface to be covered. The material for the separator may appropriately be selected by a person skilled in the art depending on the type of the adhesive layer. The separator may for example be a silicone-based separator, a polypropylene (PP)-based separator, or a fluorine-based separator.

[Applications of Film]

A film of the present invention may for example be for outdoor use. The film of the present invention is less likely to be deteriorated even when placed outdoor over a prolonged period because its weatherability is excellent.

A film of the present invention may for example be used for covering a face having letters or patterns thereon. The film of the present invention has excellent transparency and excellent weatherability. Therefore, when the face is covered according to the present invention, it is possible to maintain the visibility of the letters or patterns over a prolonged period while preventing disappearance of the letters or patterns due to the effects of ultraviolet rays.

The face may for example be a face of a nameplate or a seal, and may for example be a face of a nameplate or a seal to be pasted to an electric appliance (particularly electric appliance for outdoor use). The face may also be the face of a sign board or a road sign. In other words, a film of the present invention may be employed for protecting a nameplate, a seal, a sign board or a road sign, or may be employed for protecting letters or patterns provided on the surface of the nameplate, the seal, the sign board or the road sign. For such applications, the film of the present invention is particularly suitable.

The face may for example be a metal face or a resin face. The material which forms the metal face may for example be aluminum, stainless steel or brass. The material which forms the resin face may for example be a polyethylene terephthalate resin, an acrylic resin or a vinyl chloride resin.

[Method of Manufacturing Film]

A method of manufacturing a film of the present invention may comprise an applying step, in which a fluororesin composition is applied onto one face of a base layer constituted by a thermoplastic resin, and a curing step, after the applying step, in which the fluororesin composition is cured. By the method of manufacturing, a film of the present invention may be manufactured.

The base layer and the fluororesin composition used in the applying step are not explained here since the explanation described above applies to them. As a method of manufacturing a fluororesin composition, a method for manufacturing explained below for example in "2. Method of manufacturing fluororesin composition" may be employed.

By conducting the curing step, a fluororesin layer descried above is formed.

The applying step may appropriately be carried out by a person skilled in the art so as to achieve intended layer thicknesses. For example, the fluororesin composition may be applied onto two faces of the base layer by gravure rolling, reverse rolling, offset gravure coating, kiss coating, reverse kiss coating, wire bar coating, spray coating, or impregnation coating. An apparatus for coating by such methods may appropriately be selected by a person skilled in the art.

The curing step comprises heating the fluororesin composition, for example, at 100° C. to 200° C., preferably at 120° C. to 180° C., for example, for 10 seconds to 240 seconds, preferably for 30 seconds to 120 seconds. By the heating, the fluororesin composition is cured and fluororesin layer is formed.

Furthermore, the method of manufacturing may comprise an adhesive layer forming step, in which an adhesive layer constituted by an acrylic resin composition is formed on the other face of the base layer. As a result, a film according to the present invention having a layer structure in which the fluororesin layer, the base layer and the adhesive layer are laminated in this order is manufactured.

Furthermore, the method of manufacturing may comprise a separator laminating step, in which a separator is laminated to the adhesive layer. By conducting these steps, a film according to the present invention having a layer structure in which the fluororesin layer, the base layer, the adhesive layer and the separator layer are laminated in this order is manufactured.

2. Method of Manufacturing Fluororesin Composition

The present invention also provides a method of manufacturing a fluororesin composition. A dissolving step and a mixing step included in the method of manufacturing are described below.

In the dissolving step, a photostabilizer is dissolved in an ester-based, ketone-based or aromatic solvent to obtain a solution. The photostabilizer and the solvent are as explained in "1. Film" described above, and such explanation applies to the method of manufacturing. By preparing the solution followed by mixing the solution with a tetrafluoroethylene polymer, the photostabilizer can satisfactorily been dispersed in a fluororesin composition containing the tetrafluoroethylene polymer.

According to one embodiment of the present invention, the solvent preferably comprises an ester-based solvent, more preferably comprises a single one or a mixture of two or more selected from ethyl acetate, butyl acetate, 2-ethoxyethyl acetate and propylene glycol monomethyl ether acetate, more preferably comprises ethyl acetate and/or butyl acetate, and may especially contain ethyl acetate. An ester-based solvent, especially ethyl acetate is preferred particularly because it increases the dispersibility of the photostabilizer in the fluororesin composition and improves the coating properties of the fluororesin composition. An ester-based solvent, especially ethyl acetate is preferred also in view of reduction in environmental impact and reduction in cost.

For example, preferably the solvent is only an ester-based solvent, more preferably only a single one or a combination of two or more selected from ethyl acetate, butyl acetate, 2-ethoxyethyl acetate and propylene glycol monomethyl ether acetate, more preferably only ethyl acetate and/or butyl acetate, and especially preferably only ethyl acetate.

For example, the solvent may also be a combination of an ester-based solvent and an aromatic solvent, and may for example be a combination of ethyl acetate and toluene. For example, the mass ratio of ethyl acetate and toluene or MEK may for example be 2:1 to 20:1, preferably 5:1 to 15:1, and more preferably 8:1 to 12:1.

In the mixing step, the solution obtained in the dissolving step is mixed with a tetrafluoroethylene polymer. As a result of mixing, a fluororesin composition is obtained. The fluororesin composition preferably contains no chlorine, more preferably contains a tetrafluoroethylene resin majorly as a fluororesin component, and more preferably contains a tetrafluoroethylene resin exclusively as a fluororesin component. While the photostabilizer is sparingly dispersed in a fluororesin composition containing a tetrafluoroethylene polymer, the solution is dispersed readily in the fluororesin composition, and accordingly the solution allows the photostabilizer to be dispersed satisfactorily in the fluororesin composition.

In the mixing step, a curing agent may further be mixed with the fluororesin composition. The curing agent is as explained in "1. Film" described above, and such explanation applies to the method of manufacturing. The curing agent may be added to the fluororesin composition for example as a mixture with the solvent. As a result of a curing reaction of the curing agent with the tetrafluoroethylene polymer, the fluororesin layer may be formed.

A fluororesin composition obtained in the mixing step may be used for manufacturing a film of the present invention. For example, by applying the fluororesin composition to the base layer followed by curing, a film of the present invention can be obtained.

In other words, the present invention also provides a method of manufacturing a film. The method of manufacturing may comprise a dissolving step, in which the photostabilizer is dissolved in any single solvent or a solvent mixture of two or more selected from the group consisting of ester-based solvent, ketone-based solvent and aromatic solvent thereby obtaining a solution; a mixing step, in which the solution is mixed with a tetrafluoroethylene polymer to obtain a fluororesin composition; and a curing step, in which the fluororesin composition is applied to the base layer and cured. The curing step provides a film according to the present invention. The dissolving step and the mixing step are as described above. To the curing step, the explanation with regard to the technique for obtaining a fluororesin layer described above in "1" applies.

The present invention will next be described in more detail with reference to examples. The examples described below are merely typical examples of the present invention, and the scope of the invention is not intended to be limited to these examples.

Test Example 1: Evaluation of Dispersibility of Photostabilizer in Fluororesin Composition (1) Mixing of Photostabilizer with Fluororesin Composition A triazine-based ultraviolet absorber (2-(4,6-diphenyl-1,3,5-triazine-2-yl)-5-[2-(2-ethylhexanoyloxy)ethoxy]phenol, ADEKASTAB LA-46, ADEKA CORPORATION) in a powder form was added to and mixed with a hydroxy group-containing tetrafluoroethylene polymer composition (Zeffle GK570, DAIKIN INDUSTRIES, LTD., containing 65% by mass of hydroxy group-containing tetrafluoroethylene polymer). However, the viscosity of the composition after adding the ultraviolet absorber was high, and the resultant mixture was not homogeneous. Accordingly, the mixture was difficult to be applied onto the film, and the film transparency when the mixture is applied to a film to form a fluororesin layer is considered to be poor.

(2) Addition of Mixture of Photostabilizer and Solvent to Fluororesin Composition A set of a hydroxy group-containing tetrafluoroethylene polymer composition (Zeffle GK570, DAIKIN INDUSTRIES, LTD., containing 65% by mass of hydroxy group-containing tetrafluoroethylene polymer), a triazine-based ultraviolet absorber (2-(4,6-diphenyl-1,3,5-triazine-2-yl)-5 [2-(2-ethylhexanoyloxy)ethoxy]phenol, ADEKASTAB LA-46, ADEKA CORPORATION) in a powder form and ethyl acetate in amounts shown in the column of each experiment number in Table 1 shown below was prepared. The set of each experiment number shown in Table 1 had the amount of each component which was so adjusted that the solid content (non-volatile content, NV) became about 50% by mass after mixing.

By conducting the experiments shown below in (2-1) to (2-4), the dispersibility of the photosensitizer in the fluororesin composition after adding the mixture of the photostabilizer and the solvent to the fluororesin composition was evaluated.

TABLE 1

| Experiment Number | 1 | 2 | 3 | 4 | 5 |
|---|---|---|---|---|---|
| Ratio of LA-46 to fluororesin (% by mass) | 1% | 2% | 3% | 5% | 10% |
| GK570 (parts by mass) | 100 | 49 | 32.33 | 38 | 9 |
| LA-46 (parts by mass) | 1 | 1 | 1 | 2 | 1 |
| Ethyl acetate (parts by mass) | 30 | 15.7 | 11 | 13.4 | 3.7 |
| Total | 131 | 65.7 | 44.33 | 53.4 | 13.7 |
| NV | 50% | 50% | 50% | 50% | 50% |

(2-1) Mixing of Photostabilizer with Solvent

For each of Experiment Nos. 1 to 5, the triazine-based ultraviolet absorber (LA-46) and ethyl acetate were mixed to obtain a mixture (hereinafter, the mixture obtained for Experiment No. 1 is referred to as "Mixture of Ex. 1". The same applies to other Experiment No.). The solubility of the ultraviolet absorber upon mixing was evaluated. The ratio of the ultraviolet absorber relative to 100 parts by mass of ethyl acetate and the results of the evaluation are shown below in Table 2.

TABLE 2

| Experiment Number | 1 | 2 | 3 | 4 | 5 |
|---|---|---|---|---|---|
| Ratio of LA-46 relative to 100 parts by mass of ethyl acetate (% by mass) | 3.3 | 6.4 | 9.1 | 14.9 | 27 |
| Results | Dissolved within 5 minutes. | Dissolved after about 8 minutes. | Dissolved after about 8 minutes. | Not dissolved completely. | Not dissolved completely. |

As shown in Table 2, Experiment Nos. 1 to 3 allowed the ultraviolet absorber to be dissolved completely in ethyl acetate. On the other hand, Experiment Nos. 4 and 5 failed to allow the ultraviolet absorber to be dissolved completely even after mixing for 15 minutes. Based on these results, it was revealed that by adding the ultraviolet absorber in an amount, relative to 100 parts by mass of ethyl acetate, for example of 12 parts by mass or less, more preferably 10 parts by mass or less, it becomes possible to dissolve the ultraviolet absorber in ethyl acetate. Also by adding the ultraviolet absorber in an amount, relative to 100 parts by mass of ethyl acetate, of 5 parts by mass or less, it becomes possible to dissolve the ultraviolet absorber in ethyl acetate more quickly.

Experiment Nos. 4 and 5, when adding more ethyl acetate, exhibited complete dissolution of the ultraviolet absorber.

(2-2) Mixing of Mixture of Photostabilizer and Solvent with Fluororesin

Each of the mixtures (solutions) of Ex. 1 to 3 obtained in (2-1) described above was added to a hydroxy group-containing tetrafluoroethylene polymer composition and mixed (hereinafter, the mixture obtained using the mixture of Ex. 1 is referred to as "Ink of Ex. 1". The same applies to Ex. 2 and 3.). The miscibility upon addition was evaluated. The results of the evaluation are shown below in Table 3.

TABLE 3

| Experiment Number | 1 | 2 | 3 |
|---|---|---|---|
| Evaluation results | Well Miscible | Well Miscible | Well Miscible |

As shown in Table 3, any of the mixtures of Ex. 1 to 3 was well miscible with the hydroxy group-containing tetrafluoroethylene polymer composition, and produced a homogeneous ink.

(2-3) Mixing of Curing Agent

To Inks of Ex. 1 to 3 obtained in (2-2) described above, a curing agent (isocyanurate-type polyisocyanate, Sumitomo Bayer Urethane Co., Ltd., Sumidur N3300) and a solvent (ethyl acetate and MEK) were added in mass ratios shown below in Table 4 and mixed. The miscibility between the ink and the curing agent was evaluated. The evaluation results are shown below in Table 4. Hereinafter the composition obtained using Ink of Ex. 1 is referred to as "Paint of Ex. 1". The same applies to Ink of Ex. 2 and Ex. 3

TABLE 4

| Experiment Number | 1 | 2 | 3 |
|---|---|---|---|
| Ink | 100.00 | 65.70 | 44.33 |
| Curing agent | 10.69 | 6.86 | 4.53 |

TABLE 4-continued

| Experiment Number | 1 | 2 | 3 |
|---|---|---|---|
| Ethyl acetate | 20.95 | 13.63 | 9.13 |
| MEK | 41.90 | 27.26 | 18.27 |
| Total | 173.54 | 113.45 | 76.26 |
| NV | 35 | 35 | 35 |
| Evaluation results | Well Miscible | Well Miscible | Well Miscible |

As shown in Table 4, any of Ink Ex. 1 to 3 was well miscible with the curing agent.

(2-4) Coating Properties of Paint

Paint of Ex. 1 to 3 obtained in (2-3) described above was applied to a polypropylene film (CPP, cast polypropylene). When applying, a coating machine was employed while adjusting the thickness of the layer applied at 10 The coatability when applying was evaluated. The evaluation results are shown below in Table 5.

TABLE 5

| Experiment Number | 1 | 2 | 3 |
|---|---|---|---|
| Evaluation results | Easily Coated | Easily Coated | Easily Coated |

As shown in Table 5, any of Paint Ex. 1 to 3 was easily applicable to the film.

After applying, each film was heated at 100° C. for 30 seconds to cure the paint, thereby forming a fluororesin layer. After curing, each film was allowed to stand at 40° C. for 2 days. After allowing to stand, the transparency of the fluororesin layer was verified. As a result, any of the fluororesin layer formed of Paint of Ex. 1 to 3 was found to be transparent.

Based on these results, it was revealed that, by using a solution obtained by dissolving a photostabilizer in a solvent, the photostabilizer can satisfactorily be dispersed in a fluororesin composition. It is also revealed that a photostabilizer-containing fluororesin composition obtained in this way has excellent coating properties.

Experiment No. 4 and 5 were subjected to the procedures similar to those in (2-2) to (2-4) described above while employing mixtures obtained by using additional ethyl acetate to dissolve the ultraviolet absorber entirely as described above in (2-1). As a result, the evaluation results similar to those for Experiment No. 1 to 3 were obtained. Based on these results, it can be considered that a photostabilizer existing as being dissolved in a solvent makes it possible to achieve satisfactory dispersibility in a fluororesin, good miscibility with a curing agent, and good coating properties.

Test Example 2: Evaluation of Weatherability of Film

Working Example 1: Film Manufacture

As a base layer, a film formed of a hydrolysis-resistant polyethylene terephthalate resin (LL226, Nan Ya Plastics Corporation, thickness 38 µm) was provided.

To prepare a fluororesin composition for applying to one face of the base layer, 100 parts by mass of hydroxy group-containing tetrafluoroethylene polymer composition (Zeffle GK570, DAIKIN INDUSTRIES, LTD., containing 65% by mass of hydroxy group-containing tetrafluoroethylene polymer), 3 parts by mass of triazine-based ultraviolet absorber (2-(4,6-diphenyl-1,3,5-triazine-2-yl)-5-[2-(2-ethylhexanoyloxy)ethoxy]phenol, ADEKASTAB LA-46, ADEKA CORPORATION), 14 parts by mass of isocyanurate-type polyisocyanate (curing agent, Sumidur N3300, Sumitomo Bayer Urethane Co., Ltd.) and 117.3 parts by mass of ethyl acetate were provided.

First, the triazine-based ultraviolet absorber was added to and mixed with 33 parts by mass of ethyl acetate, and the ultraviolet absorber was dissolved completely in the ethyl acetate to obtain a solution. The tetrafluoroethylene polymer composition, remainder of ethyl acetate (84.3 parts by mass) and the curing agent were added to and mixed with the solution to obtain a fluororesin composition.

To prepare an acrylic resin composition to be applied to the other face of the base layer, 100 parts by mass of thermosetting adhesive agent (acrylic acid ester copolymer, SKDINE1502C, Soken Chemical & Engineering Co., Ltd) and 0.4 parts by mass of curing agent (epoxy-based curing agent, E-AX, Soken Chemical & Engineering Co., Ltd) were provided. The adhesive agent and the curing agent were mixed to obtain an acrylic resin composition.

To one face of the base layer, the fluororesin composition was applied to a thickness of about 10 µm. The applying was conducted using an application apparatus of kiss reverse method. After applying, heating at 150° C. for 60 seconds allowed the fluororesin composition to be cured, thereby forming a fluororesin layer.

To the other face of the base layer, the acrylic resin composition was applied to a thickness of about 20 µm. The applying was conducted using an application apparatus of die method. After applying, heating at 80° C. for 2 minutes allowed the acrylic resin composition to be cured, thereby forming an adhesive layer.

As a result, a transparent film in which the fluororesin layer, the base layer and the adhesive layer were laminated in this order was obtained. This film is referred to as "film of Example 1" hereinafter in this specification.

Working Example 2: Film Manufacture

A film was manufactured by a method similar to that in Example 1 except that the amount of the triazine-based ultraviolet absorber used for preparation of the fluororesin composition was changed to 5 parts by mass. This film is referred to as "film of Example 2" hereinafter in this specification.

Comparative Example 1: Film Manufacture

A film was manufactured by a method similar to that in Example 1 except that the fluororesin composition did not contain the amount of the triazine-based ultraviolet absorber. This film is referred to as "film of Comparative 1" hereinafter in this specification.

(Evaluation 1: Weatherability of Film Itself)

The films of Examples 1 and 2 as well as the film of Comparative 1 were subjected to weatherability test. In this test, each film was subjected to a light-dark cycle shown below using a metal halide lamp accelerated weathering test machine (SUV-161, IWASAKI ELECTRIC CO., LTD.). The light-dark cycle was repeated over 240 hours in total.

Cycle 1: Light 12 hours (light irradiation, 60° C., 70 R.H., 750 W/m$^2$)

Cycle 2: Dark 12 hours (darkness, 60° C., 70 R.H., water shower given for 10 seconds every 1 hour)

The yellow index (YI) of each film before and after the light-dark cycle was determined in accordance with JIS K7373. The condition of each film was also observed visually. The results are shown in FIG. 2.

Figure 2:
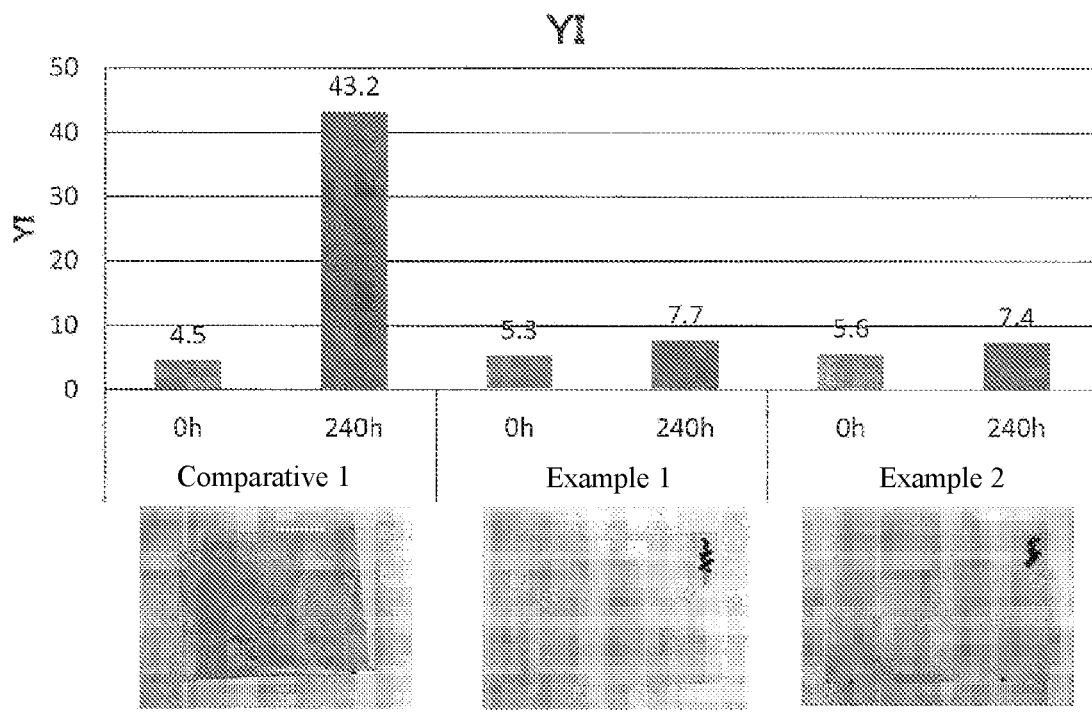
FIG. 2 is a view showing the results of evaluation of weatherability.

As shown in FIG. 2, the film of Comparative 1 exhibited an increase in the yellow index from 4.5 before the light-dark cycle to 43.2 after the cycle. On the other hand, the films of Example 1 and 2 exhibited an increase in the yellow index by about 2 after the light-dark cycle. Based on these results, the films of Example 1 and 2 were proven to have more excellent weatherability (for example, resistance to ultraviolet rays and rain etc.) when compared to the film of Comparative 1.

Also as shown in FIG. 2, a crack was formed after the light-dark cycle in the film of Comparative 1 (particularly base layer), while no such crack was present in the films of Example 1 and 2. Based on these results, the films of Example 1 and 2 were proven to have reduced deterioration when compared to the film of Comparative 1.

(Evaluation 2: Evaluation of Surface Protection Performance of Film)

The film of Example 1 was pasted onto a board formed of polyvinyl chloride. Similarly, each of the films of Example 2 and Comparative 1 was pasted onto a board formed of polyvinyl chloride. The three boards onto which these films had been pasted were subjected to the weatherability test as described above in Evaluation 1.

A color difference ΔE of each board between observation before initiation of the light-dark cycle and observation 120 hours or 240 hours after initiation of the light-dark cycle was measured in accordance with JIS Z8730. The condition of each film was also observed visually. The results are shown in FIG. 3.

Figure 3:
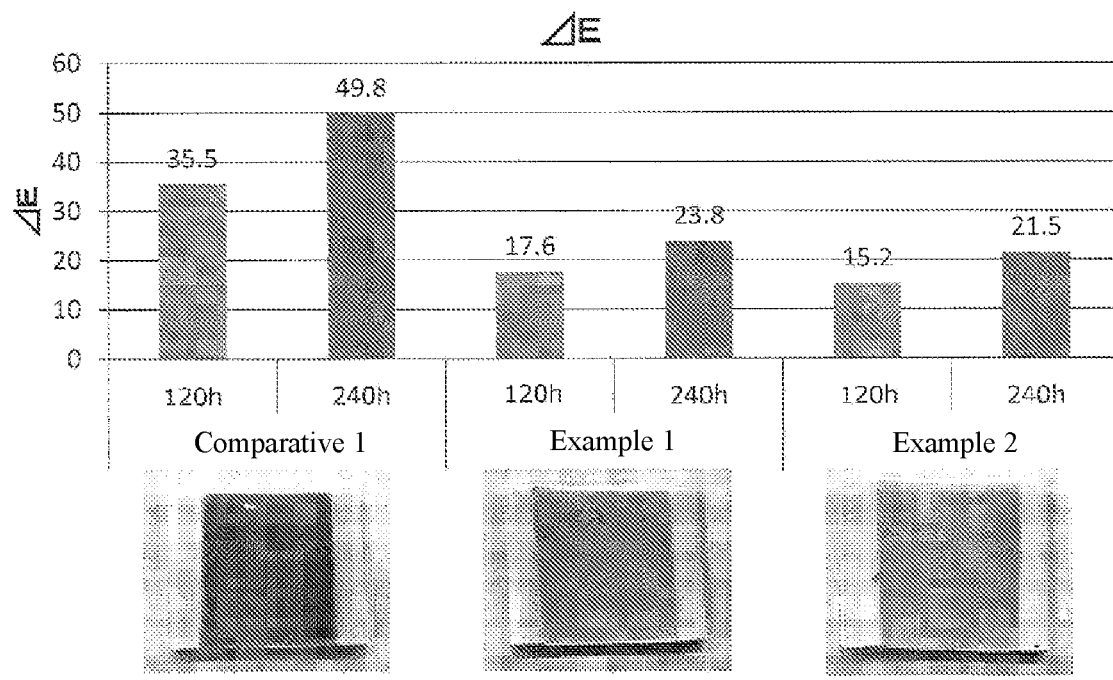
FIG. 3 is a view showing the results of evaluation of weatherability.

As shown in FIG. 3, the film of Comparative 1 exhibited a color difference ΔE which was 35.5 and 49.8 at 120 hours and 240 hours, respectively, after initiation of the light-dark cycle. On the other hand, the film of Example 1 exhibited a color difference ΔE which was 17.6 and 23.8 at 120 hours and 240 hours, respectively, after initiation of the light-dark cycle. The film of Example 2 exhibited a color difference ΔE which was 15.2 and 21.5 at 120 hours and 240 hours, respectively, after initiation of the light-dark cycle. Based on these results, the films of Example 1 and 2 were proven to reduce the deterioration and the color change of the PVC board substantially when compared to the film of Comparative 1.

A PVC board tends to be deteriorated more easily when compared to a metal board. Accordingly, it is known that, by pasting the film of Example 1 and 2 to the metal, the deterioration of the metal board can be prevented and the engraved letters or patterns on the surface of the metal board can be maintained.

Test Example 3: Film Manufacture

Except for change in the materials of the fluororesin composition for forming a fluororesin layer as shown below, a method similar to that for the film of Example 1 was employed to manufacture a film (hereinafter referred to as "film of Example 3").

In other words, as a triazine-based ultraviolet absorber described above, a combination of 1.6 parts by mass of TINUVIN400 (BASF SE) and 1.6 parts by mass of TINUVIN479 (BASF SE) was employed instead of ADEKASTAB LA-46. TINUVIN400 is a combination of 2-[4-[(2-hydroxy-3-dodecyloxypropyl)oxy]-2-hydroxyphenyl]-4,6-bis(2,4-dimethylphenyl)-1,3,5-triazine and 2-[4-[(2-hydroxy-3-tridecyloxypropyl)oxy]-2-hydroxyphenyl]-4,6-bis(2,4-dimethylphenyl)-1,3,5-triazine. TINUVIN479 is 2-[2-hydroxy-4-(1-octyloxycarbonyl ethoxy)-phenyl]-4,6-bis(4-phenylphenyl)-1,3,5-triazine. Also instead of ethyl acetate described above, a combination of 50 parts by mass of ethyl acetate and 5 parts by mass of toluene was employed.

The film of Example 3 exhibited excellent weatherability similarly to the films of Example 1 and 2.

REFERENCE SIGNS LIST 100 film
101 base layer
102 fluororesin layer
103 adhesive layer

The invention claimed is:

1. A film comprising:
a base layer formed of a thermoplastic resin, and
a fluororesin layer laminated to one face of the base layer, wherein:
the fluororesin layer consists of a tetrafluoroethylene resin and a photostabilizer,
the tetrafluoroethylene resin is obtained by a curing reaction of a hydroxy group-containing tetrafluoroethylene polymer and a curing agent,
the photostabilizer is any single compound or combination of two or more compounds selected from the group consisting of: a triazine-based ultraviolet absorber, benzotriazole-based ultraviolet absorber, benzophenone-based ultraviolet absorber, and hindered amine-based photostabilizer,
the acid value of the hydroxy group-containing tetrafluoroethylene polymer is 0.5 mg KOH/g to 100 mg KOH/g,
only one fluororesin layer is laminated to the one face of the base layer, and
the thickness of the fluororesin layer is 1 μm to 20 μm.

2. The film according to claim 1, wherein the photostabilizer is the triazine-based ultraviolet absorber.

3. The film according to claim 1, wherein the thermoplastic resin is a polyester-based resin.

4. The film according to claim 1, wherein the film is transparent.

5. The film according to claim 1, further comprising an adhesive layer laminated to a face of the base layer that is opposite from the one face.

6. The film according to claim 5, wherein the adhesive layer is formed of an acrylic resin composition.

7. The film according to claim 5, wherein a separator is laminated to the face, among two faces of the adhesive layer, which is opposite to the face in contact with the base layer.

8. The film according to claim 1, wherein the film is for outdoor use.

9. The film according to claim 1, wherein the film is used for covering a face having letters or patterns formed thereon.

10. The film according to claim 9, wherein the face is a metal face or a resin face.

* * * * *